Nov. 19, 1929.  L. E. BECK  1,736,643
ELECTRICALLY OPERATED POWER DEVICE
Filed Oct. 13, 1927
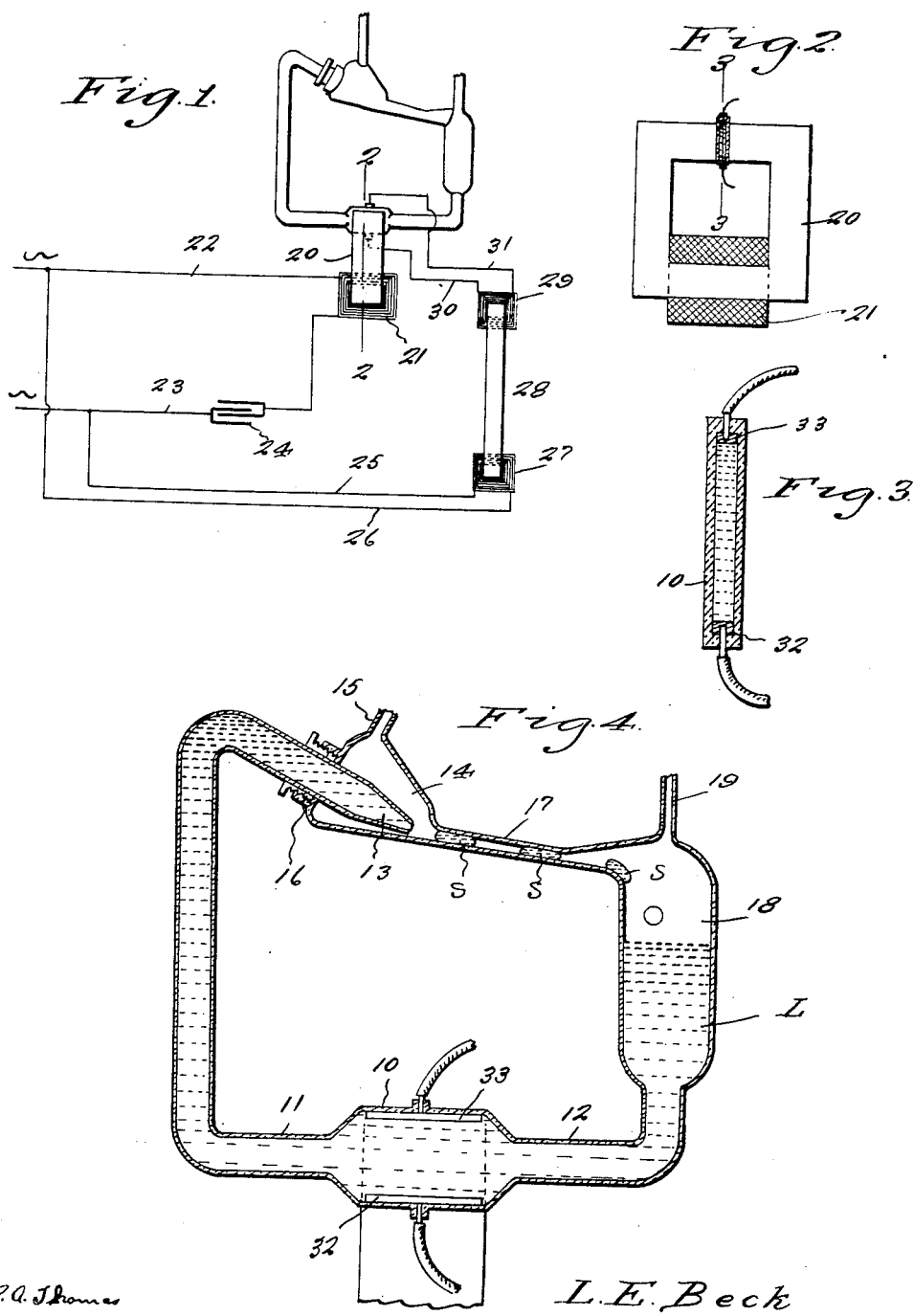
L. E. Beck
INVENTOR
BY Victor J. Evans
ATTORNEY
WITNESS:

Patented Nov. 19, 1929

1,736,643

UNITED STATES PATENT OFFICE

LESTER E. BECK, OF KELLY STATION, PENNSYLVANIA

ELECTRICALLY-OPERATED POWER DEVICE

Application filed October 13, 1927. Serial No. 226,026.

This invention relates to an electrically operated apparatus and has for its general object the provision of means whereby useful work or mechanical power may be obtained as the result of the passage of a current carrying liquid conductor across or through a magnetic field.

It is well known that when a liquid conductor carrying an electric current, is placed in a magnetic field having a component at right angles to the direction of current flow in the conductor, a force is exerted upon the liquid which sets it in motion. While this principle has heretofore been used, it has been applied to the measurement of electric current and has not, so far as I am aware, been used for any other purpose, probably due to the fact that it requires a very strong current through a liquid conductor to obtain a reasonable force. As the voltage developed across the liquid conductor by reason of its motion through a magnetic field is very low, this requirement renders it impossible to use the apparatus successfully or commercially on any but extremely low voltage systems. Further, its use has been confined to direct current applications.

It is with the above facts in view that I have designed the present invention which has for a very important object the provision of a system and apparatus taking advantage of these physical and electrical laws and so arranged as to permit the use of a high voltage alternating current supply suitably stepped down in regard to the electro-motive force so as to obtain a heavy current or one of high amperage capable of operating the system in such manner as to derive a practical amount of power therefrom.

The invention further contemplates the provision of an apparatus and system of this character embodying means for producing a magnetic flux of an alternating character reacting against an alternating current passing through a liquid conductor to produce movement of the latter, means being provided for maintaining the magnetic flux and alternating current flow in the proper phase relation so that maximum efficiency will be assured.

An additional object of the invention is to provide an apparatus and system of this character which will be simple and inexpensive to manufacture, easy to assemble or install, positive in action, efficient and durable in service, and a general improvement in the art.

To the attainment of the foregoing and other objects and advantages, the invention preferably consists in the detailed construction and the arrangement and combination of parts or apparatus to be hereinafter more fully described and claimed, and illustrated in the accompanying drawings, in which:

Figure 1 is a diagram illustrating one embodiment of the invention.

Figure 2 is an enlarged sectional view taken substantially on the line 2—2 of Figure 1.

Figure 3 is an enlarged section on the line 3—3 of Figure 2, and

Figure 4 is a sectional view illustrating an actual or practical apparatus used for compressing gas and other liquids.

In the drawings I have shown the general features of the invention embodied in a compressor or pump, but it should be understood that this is in no way restricted but simply for purposes of explanation.

Referring to the drawings in detail, the numeral 10 designates a casing of suitable insulating material from the opposite ends of which project tubes 11 and 12, which are likewise of dielectric material, such as glass. The tube 11 terminates in a nozzle 13 which extends into a chamber 14 in communication with a pipe 15 through which gas or other fluid is supplied from a suitable source. The tube enters the chamber 14 through a suitable packing gland 16 at one end of the chamber, and extending from the chamber 14 is a relatively constricted compression passage 17 whose cross sectional area is preferably substantially the same as that of the tip of the nozzle 13. The passage 17 leads to a chamber 18 of relatively large capacity and which is provided with a pipe 19 for the outward passage of the compressed gas or liquid. The chamber 18 connects with the tube 12 so that the conductor liquid indicated at L may return to the casing 10. While other materials may be used, mercury is a highly satisfactory one to constitute the liquid conductor.

The casing 10 is placed in a gap in the magnetic circuit of an electromagnet including an iron core 20 which caries a coil 21, so that the flux or field will pass through the casing. The coil is connected by means of conductors 22 and 23 with a source of alternating current, and one conductor has interposed therein a static condenser 24. Other conductors 25 and 26 connect with the supply or power line and lead to the primary coil 27 of a transformer 28, the secondary coil 29 of which is connected by conductors 30 and 31 with electrodes or terminals 32 and 33 located within the casing 10 and extending preferably longitudinally thereof. It is advisable that these electrodes be of some material not chemically acted upon by the mercury or other conducting liquid used.

In the operation of the apparatus, an alternating current flowing in the magnet coil 21 produces an alternating magnetic flux or field which passes through the conducting liquid L at right angles to the alternating current which flows through the liquid conductor between the contact strips 32 and 33 from the low voltage coil 29 of the transformer, the current flow and magnetic flux reacting on each other. If this current is in time phase, or 180 degrees out of time phase with the magnetic flux, a pulsating unidirectional force is exerted upon the liquid in the casing causing it to move or acquire a mechanical current possessing kinetic energy. If the current is leading or lagging the magnetic flux by 90 degrees, an alternating force upon the conductor results, whose effect is zero, and it will therefore be seen that it is desirable to have the electric current and magnetic flux as nearly in phase, or as nearly 180 degrees out of phase, as is possible, hence I provide the condenser 24 to bring about the approximate phase relation desired. However, any suitable device for varying the phase relation between the flux in the core 20 and the current in the supply line 22 and 23, may be substituted. It is possible to omit the condenser 24 entirely and still obtain the desired results, depending upon the constants of the apparatus. Further, while the transformer 28 is shown as a separate unit, the coil 29 may be placed on the core 20 so that this core will serve a double purpose, and it is conceivable that the transformer 28 may be also omitted under certain conditions. Reverting to the feature of phase relation, it may occur that the best results might be obtained by operating a few degrees out of phase, exactitude in this respect not being essential.

By reason of the pulsating movement of the liquid L brought about as set forth a pressure is set up in the tube 11, this pressure rising and falling at a frequency depending practically upon the cycle frequency of the current supply. This results in the liquid being forced out of the nozzle 13 in slugs as indicated at S in Figure 4, rather than in a continuous stream, as would be the case if a constant pressure on the liquid were to exist. Gas or air entering the chamber 14 is entrapped in the tube or passage 17 by the successive slugs S and is compressed by the kinetic energy possessed by them during their movement. The passage 17 must be of sufficient length that at no time during the operation of the apparatus will it open and thus permit a backward flow. The fluid and liquid conductor enter the chamber 18 and by reason of their difference in density, the fluid will pass out through the pipe 19, while the liquid will return to the casing 10 through the tube 12.

The apparatus has been described as a compressor, but it is obvious that it may be used as a liquid pump, the water or other liquid entering through the pipe 15 and passing out through the pipe 19.

From the foregoing description and a study of the drawings, it will be apparent that I have thus provided a very simply constructed and arranged compressor or pump system which will be of manifest advantage on account of the elimination of moving mechanical elements such as valves, pistons and transmission mechanism such as form part of the ordinary compressors or pumps, the apparatus being, furthermore, noiseless, or substantially so, in operation and incapable of wearing out owing to the absence of moving parts other than the conducting liquid. Obviously, there is likewise no necessity for any lubricating features and the apparatus will consequently operate with great economy. It is really believed that the construction, operation and advantages will be readily apparent to one skilled in the art without further explanation.

While I have shown and described a certain embodiment of the invention, it will be understood that this is merely for the purpose of explanation, the principal and essential feature being the general combination embodying the broad principles set forth. I therefore reserve the right to make all such changes in the details of construction and the arrangement of apparatus as will not depart from the spirit of the invention or the scope of the subjoined claims.

Having thus described the invention, I claim:

1. In an apparatus of the character described, a container of insulating material, a conducting liquid within the container, means for passing a magnetic flux of an alternating character through the liquid, means for passing an alternating current through the liquid in a manner to traverse the magnetic flux whereby the mutual reaction of the magnetic flux and alternating current will cause the liquid to move within the container.

2. In an apparatus of the character described, a container of insulating material, a conducting liquid within the container, means for passing a magnetic flux of an alternating character through the liquid, means for passing an alternating current through the liquid in a manner to traverse the magnetic flux whereby the mutual reaction of the magnetic flux and alternating current will cause the liquid to move within the container, and means for synchronizing the phase of the alternating current and the magnetic flux.

3. In an apparatus of the character described, a container of insulating material, a conducting liquid within the container, means for passing a magnetic flux of an alternating character through the liquid, means for passing an alternating current through the liquid in a manner to traverse the magnetic flux whereby the mutual reaction of the magnetic flux and alternating current will cause the liquid to move within the container, and means for timing the phase of the alternating current with respect to that of the magnetic flux whereby they will be either in phase or one hundred and eighty degrees out of phase.

4. In an apparatus of the character described, a container of insulating material, a conducting liquid within the container, spaced electrodes within the container in physical and electrical contact with the liquid, means for supplying a low voltage alternating current to said electrodes whereby it will traverse the liquid, and means for producing an alternating magnetic flux to the liquid synchronized with the phase of the alternating current to react therewith and cause movement of the liquid.

5. In an apparatus of the character described, an electromagnet having pole pieces, a container of insulating material located between the pole pieces and containing a conducting liquid, an alternating current circuit for energizing the electromagnet to produce an alternating magnetic flux through the liquid, and a circuit for supplying a low voltage alternating current through the liquid in traversing relation to the magnetic flux, the low voltage current being obtained through a transformer.

6. In an apparatus of the character described, an electromagnet having pole pieces, a container of insulating material located between the pole pieces and containing a conducting liquid, an alternating current circuit for energizing the electromagnet to produce an alternating magnetic flux through the liquid, and a circuit for supplying a low voltage alternating current through the liquid in timed traversing relation to the magnetic flux, the container having inlet and outlet chambers therein connected by a constricted passage, one chamber having inlet means for a fluid and the other having outlet means therefor, and a nozzle within the inlet chamber whereby the liquid may be projected into said passage to entrap the fluid.

7. The method of moving a conducting liquid through a container of insulating material, comprising passing an alternating magnetic flux through the container and liquid, passing an alternating current through the liquid to traverse the magnetic flux, and varying the phase relation to effect synchronism.

8. The method of moving a conducting liquid through a container of insulating material, comprising passing an alternating magnetic flux through the container and liquid, and passing an alternating current through the liquid to traverse the magnetic flux, and regulating the timing of the magnetic flux with respect to the alternating current flow.

In testimony whereof I affix my signature.

LESTER E. BECK.